United States Patent
Dorn

[15] 3,696,554
[45] Oct. 10, 1972

[54] STEERING MECHANISM FOR TOY VEHICLES

[72] Inventor: Jerome Dorn, 1826 Borland Road, Pittsburgh, Pa. 15243

[22] Filed: Aug. 20, 1970

[21] Appl. No.: 65,613

[52] U.S. Cl. ..................................................46/201
[51] Int. Cl. ............................................A63h 11/10
[58] Field of Search.........................46/221, 213, 201

[56] References Cited

UNITED STATES PATENTS

| | | | |
|---|---|---|---|
| 2,887,823 | 5/1959 | Vaughan | 96/201 |
| 2,216,497 | 10/1940 | McHenry | 46/201 |
| 2,386,745 | 10/1945 | Yarbrough | 46/201 |

*Primary Examiner*—Robert Peshock
*Assistant Examiner*—A. Heinz

[57] ABSTRACT

A steering device for toy hand vehicles which will eliminate the need for a steering wheel. This device includes a horizontal shaft which is secured within the side walls of the vehicle and a U-shaped frame is pivotable frontwards and rearwards, the U-shaped frame being carried within a pair of sleeves having projecting axle members for the wheels of the toy. A pair of steering arms extend from the sleeves carrying the U-shaped member, the arms being secured together by a horizontal tie rod, the device being steered by applying force upon the vehicle to the right or left which causes the mechanism to turn the wheels in that direction.

5 Claims, 3 Drawing Figures

PATENTED OCT 10 1972  3,696,554
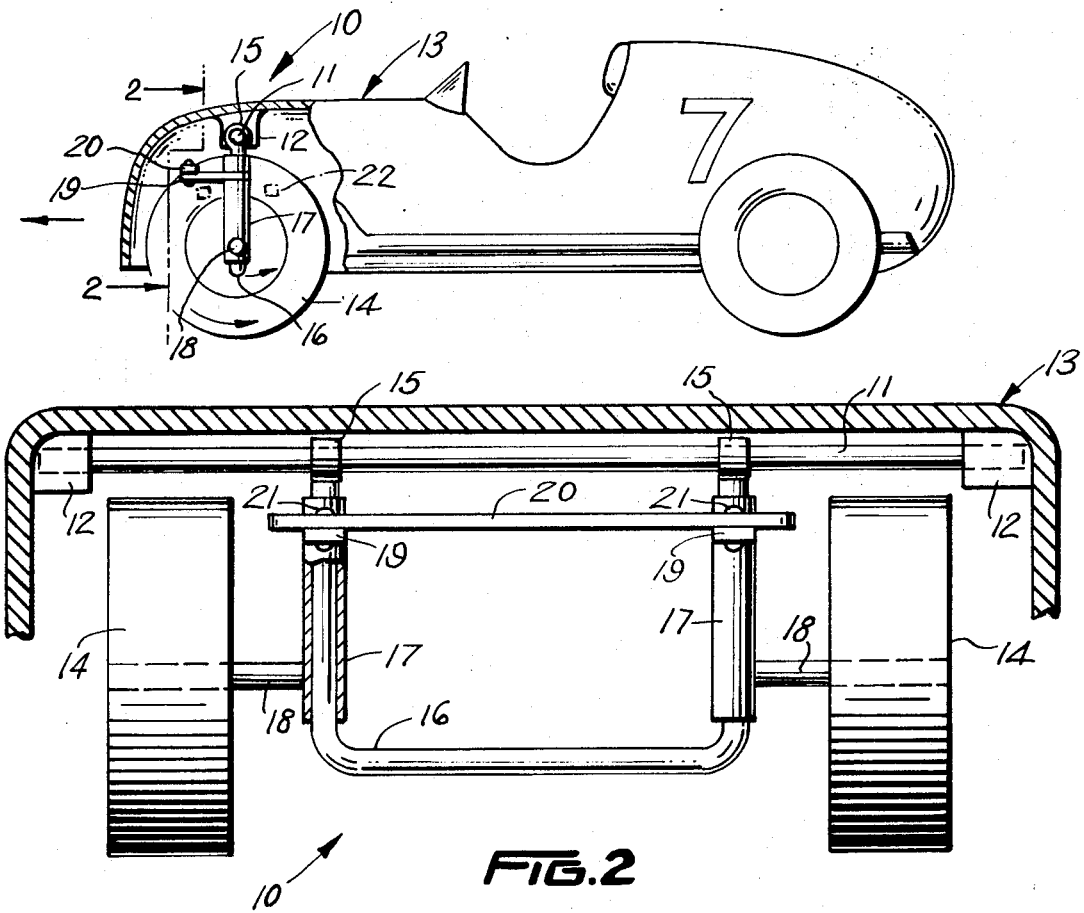
FIG.1
FIG.2
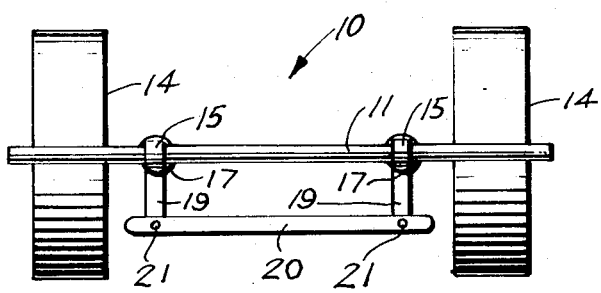
FIG.3
INVENTOR.
JEROME DORN

STEERING MECHANISM FOR TOY VEHICLES

This invention relates to steering gear, and more particularly to a steering mechanism for toy vehicles.

It is therefore the primary purpose of this invention to provide a steering mechanism for toy vehicles which will not utilize the well-known steering wheel, the steering being accomplished by applying pressure to the vehicle in a direction that the user wants to turn the vehicle.

Another object of this invention is to provide a steering mechanism of the type described which will have a fixed upper shaft to which is attached a pivotable U-shaped frame, the U-shaped frame being held within sleeves, the sleeves having steering arms which are connected by tie rod means so as to react together, the sleeves also having extending from each, a spindle upon which the wheels are carried.

Other objects of the present invention are to provide a steering mechanism for toy vehicles which is simple in design, inexpensive to manufacture, rugged in construction, easy to use, and efficient in operation.

These and other objects will be readily evident upon a study of the following specification and the accompanying drawing, wherein:

FIG. 1 is a side view of the present invention shown secured within a toy vehicle, the vehicle being shown partly broken away for clarity.

FIG. 2 is an enlarged cross sectional view taken along the lines 2—2 of FIG. 1, one of these sleeve portions being shown broken away.

FIG. 3 is a top plan view of the mechanism shown removed in its entirety from the vehicle shown in FIG. 1.

According to this invention, a steering mechanism 10 is shown to include a stationary cross shaft 11 which is secured fixedly within projections 12 of interior of vehicle 13, the shaft 11 normally being over the center of the steering wheels 14. A pair of pivotably eyes 15 at the upper extremity of a U-shaped frame 16 are free to rotate upon the shaft 11 forwardly and rearwardly for effecting steering of vehicle 13. A pair of vertical sleeves 17 are freely rotatable upon U-shaped frame 16 for a manner which hereinafter will be described.

Extending sidewardly within vehicle 13 are spindles 18 which are fixedly secured to sleeves 17 and carry the steering wheels 14. A steering arm 19 also is secured to sleeves 17 and extends forwardly within vehicle 13, a horizontAL tie rod 20 being secured pivotably thereto by means of pins 21. A pair of stop members 22 on either side of U-shaped frame 16 of mechanism 10 provides a means of limiting the forward and rearward motion of frame 16, the stop members 22 being fixedly mounted in a suitable manner (not shown).

In use, when the vehicle 13 is pushed forward, the eye 15 mounted steering apparatus 10 which is swiveled from the stationary shaft 11, swings toward the rear of vehicle 13 and assumes a negative caster angle. By the use of a slight amount of force downward on the vehicle 13 at the left or right, the front wheels 14 will follow that path in such direction as long as the downward force is maintained. The path of direction is produced by the pressure of the user's hands downward upon the particular right or left side of the toy vehicle body top surface. When the vehicle 13 is pushed rearward, the eye 15 mounted steering apparatus 10 swings to the front of the vehicle 13, assuming a positive caster angle. The same force procedures will induce the steering wheels 14 to track or follow the direction desired.

It shall be noted that the caster angles will be determined by the individual vehicle 13 size, weight, etc.

It shall further be noted that the U-shaped frame 16 is limited in its forward and rearward motion by means of the stop members 22 so that the turning radius size is controlled by the distances away of the stops from the frame 16.

I claim:

1. In a combination toy vehicle and steering mechanism for movement over a horizontal surface, the combination of a steering mechanism, a toy vehicle body supported upon rear wheels and a pair of front wheels, said front wheels being attached to said steering mechanism, said toy body comprising a longitudinally extending shell that is hollow on its underside, said steering mechanism comprising a horizontal shaft positioned transversely to the longitudinal direction of said body and secured at its opposite ends to said body, a downward depending pivotable U-shaped frame carried by said fixed shaft, a pair of vertical sleeve members carried by said U-shaped frame of said mechanism with spindle means for mounting the front wheels of said vehicle on said sleeve members steering arm members carried by said sleeves with tie rod means for connecting said steering arms, said U-shaped frame being comprised of a pair of horizontally spaced apart leg portions which at their lower ends are interconnected by a horizontal bight portion, eye portions at the upper extremity of said U-shaped frame being rotatably carried upon said stationary shaft, said stationary shaft being fixedly secured within projections on the underside of the body of said vehicle and said sleeves are rotatable about said leg portions of said U-shaped frame in order to effect steering of said vehicle by applying pressure upon said vehicle in a direction a user wants to turn said vehicle.

2. The combination according to claim 1, wherein said sleeves carry said spindles fixedly near their lower extremities, said spindles are rotatably carrying said front wheels of said vehicle and said steering arms project from said sleeves forwardly within said vehicle and said tie rod is connected to said steering arms by suitable pivot pin means to effect the simultaneous rotation of said sleeves and their associated spindles carrying said front wheels of said vehicle.

3. The combination according to claim 2, wherein said vehicle when pushed forward causes the eye supported U-shaped frame to pivot toward the rear of said vehicle which assumes a negative caster angle and by the use of a slight amount of force upon said vehicle to the left or right, said front wheels will rotate with said sleeves to follow the path as long as said force is maintained, the path of direction being produced by the pressure of the user's hands.

4. The combination according to claim 3, wherein said vehicle when pushed rearwards causes said U-shaped frame to swing forwardly within said vehicle and assume a positive caster angle, the same force procedure inducing said front wheels of said vehicle to track or follow the direction the user desires, the caster angles being determined by the vehicle size, weight, etc.

5. The combination according to claim 4, wherein said tie rod causes said wheels to turn simultaneously when pressure is applied to said vehicle and thus said sleeves rotate simultaneously upon said U-shaped frame of said mechanism, the forward and rear pivoting of said U-shaped frame being governed by stop members within said vehicle so as not to interfere with the motion and steering of said vehicle.

* * * * *